United States Patent
Vogley

(10) Patent No.: US 7,603,040 B2
(45) Date of Patent: Oct. 13, 2009

(54) CHIP TO CHIP OPTIC ALLEYS AND METHOD

(76) Inventor: Wilbur C. Vogley, 137 Hunter Dr., Cranberry Township, PA (US) 16066-7605

( * ) Notice: Subject to any disclaimer, the term of this patent is extended or adjusted under 35 U.S.C. 154(b) by 0 days.

(21) Appl. No.: 11/139,922

(22) Filed: May 27, 2005

(65) Prior Publication Data

US 2005/0271388 A1    Dec. 8, 2005

Related U.S. Application Data

(60) Provisional application No. 60/576,692, filed on Jun. 2, 2004.

(51) Int. Cl.
*H04B 10/00* (2006.01)
(52) U.S. Cl. ...................... 398/164; 398/154
(58) Field of Classification Search ................ 398/154, 398/155, 164; 385/14
See application file for complete search history.

(56) References Cited

U.S. PATENT DOCUMENTS

| | | | | |
|---|---|---|---|---|
| 5,345,527 A | * | 9/1994 | Lebby et al. | 385/114 |
| 5,692,166 A | * | 11/1997 | Milhizer et al. | 713/400 |
| 6,527,456 B1 | * | 3/2003 | Trezza | 385/89 |
| 6,620,642 B2 | * | 9/2003 | Dudoff et al. | 438/26 |

* cited by examiner

*Primary Examiner*—Christina Y Leung
(74) *Attorney, Agent, or Firm*—Ansel M. Schwartz

(57) ABSTRACT

A data link includes an ASIC. The data link includes a heat insulation layer in contact with the ASIC. The data link includes an optical transducer layer having a plurality of transducers, with each transducer of the plurality of transducers in communication with the ASIC. Each transducer converting optical signals to electrical signals or electrical signals to optical signals. The data link includes an optical waveguide layer having a plurality of waveguides for carrying optical signals. Each waveguide of the plurality of waveguides in optical communication with a transducer, the optical waveguide layer adjacent with the insulation layer. An apparatus for data. A method for transferring data.

12 Claims, 13 Drawing Sheets

FEATURES

STANDARD UBGA ON MULTI-LAYER BOARD.

CHIP TO CHIP OPTIC ALLEYS AND METHOD

This application claims the benefit of U.S. Provisional Application No.: application Ser. No. 60/576,692 filing date Jun. 2, 2004.

FIELD OF THE INVENTION

The present invention is related to the transfer of data using optical signals. More specifically, the present invention is related to the transfer of data using optical signals with the use of an electrical interface and a photonic interface and optical wave guide links.

BACKGROUND OF THE INVENTION

The current strategy for data flow is to take electrical interfaces as far as technology will allow it to go. The architecture is the same as it was 40 years ago — move data from a logic device to another logic device through a board/backplane on copper separated by space and a dielectric.

SUMMARY OF THE INVENTION

The present invention improves the technology by increasing speed at which data flows, reduces power per Gbps, reduces susceptibility to outside interference, and substantially reduces cost of future systems. The present invention is a photonic interface as the link for data between all devices within any system.

The present invention pertains to a data link. The data link comprises an ASIC preferably having connectors, such as input/output pins. The data link comprises a heat insulation layer in contact with the ASIC preferably having holes in alignment with the input/output pins. The data link comprises an optical transducer layer having a plurality of transducers, with each transducer of the plurality of transducers in communication with the ASIC and preferably in alignment with a hole in the insulation layer. Each transducer is preferably in communication with an input/output pin. Each transducer converting optical signals to electrical signals or electrical signals to optical signals. The data link comprises an optical waveguide layer having a plurality of waveguides for carrying optical signals. Each waveguide of the plurality of waveguides in optical communication with a transducer, the optical waveguide layer adjacent with the insulation layer.

The present invention pertains to an apparatus for data. The apparatus comprises a first ASIC. The apparatus comprises a second ASIC. The apparatus comprises a plurality of optical waveguides connected to the first ASIC and the second ASIC through which data and timing to synchronize the data in the waveguides is transferred between them.

The present invention pertains to a method for transferring data. The method comprises the steps of producing electrical signals by an ASIC preferably having output pins. There is the step of sending the electrical signals from the ASIC preferably out through the output pins to transducers of an optical transducer layer, where there is a heat insulation layer in contact with the ASIC preferably having holes in alignment with the input/output pins through which the electrical signals communicate from the output pins to the transducers. There is the step of converting the electrical signals to optical signals with the transducers. There is the step of sending the optical signals from the transducers to waveguides of an optical waveguide layer adjacent with the optical transducer layer.

The present invention pertains to a method for transferring data. The method comprises the steps of receiving optical signals from an optical waveguide layer in contact with an optical transducer layer. There is the step of receiving electronic signals from a photonic sensor device which converts the optical signals to electronic signals of the optical transducer layer through the input pins of the ASIC, where there is a heat insulation layer in contact with the ASIC having holes in alignment with the input pins through which the electrical signals communicate with the photonic sensor device to the CMOS device input pins, the photonic sensor converting the photonic signals to electronic signals.

The present invention pertains to an optical interface. The optical interface comprises an ASIC and an optical transducer layer which converts optical signals that the layer receives into electrical signals for the ASIC and converts electrical signals from the ASIC into optical signals. The ASIC does not use an encryption architecture. The ASIC uses a direct parallel modulation bus and has a separate clock photonic path that uses a feedback loop to determine delays of individual paths for timing alignment.

BRIEF DESCRIPTION OF THE DRAWINGS

In the accompanying drawings, the preferred embodiment of the invention and preferred methods of practicing the invention are illustrated in which.

DETAILED DESCRIPTION

Figure 3:
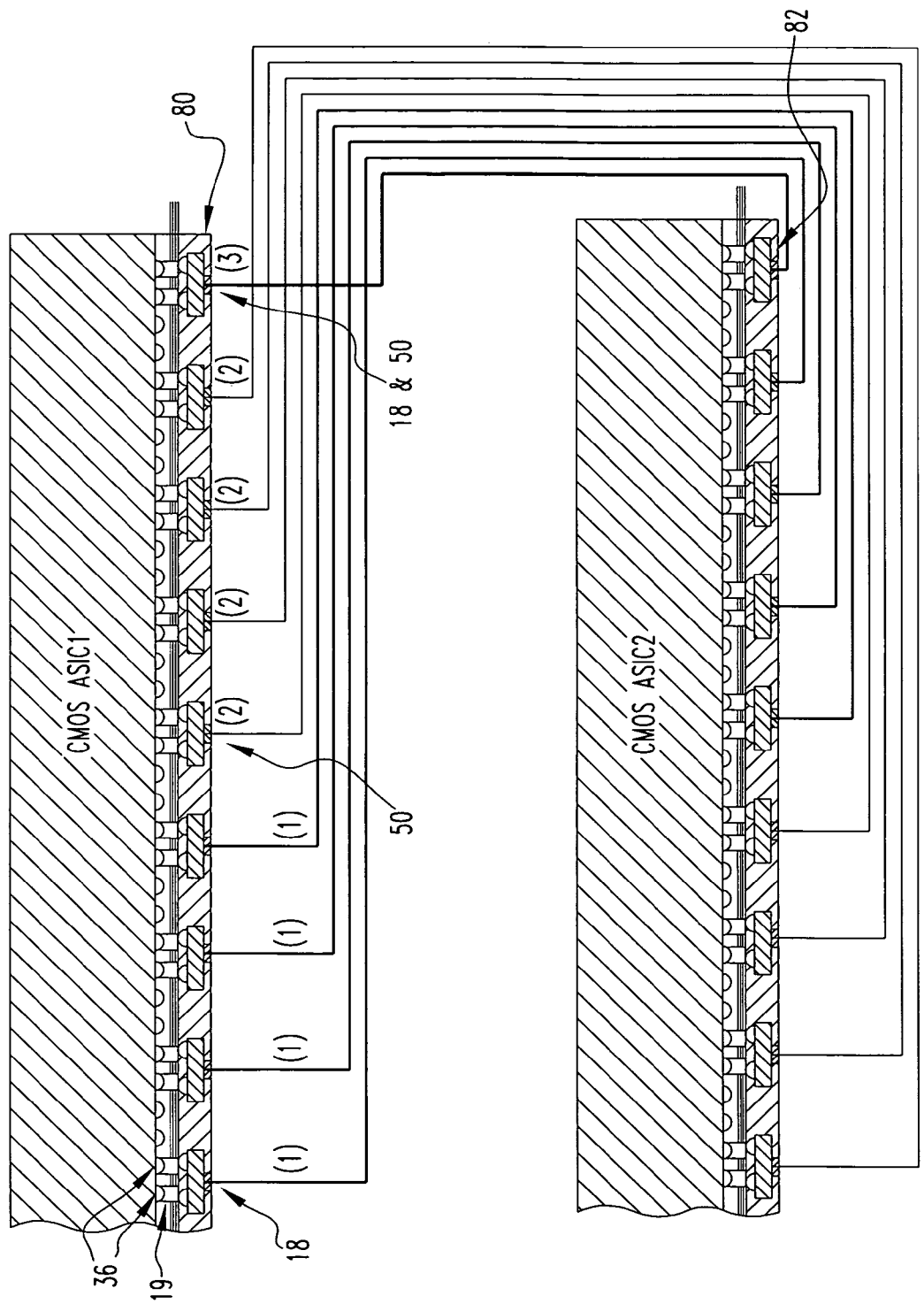
FIG. 3 shows a first ASIC and a second ASIC in communication with each other through wave guide links.
Figure 15:
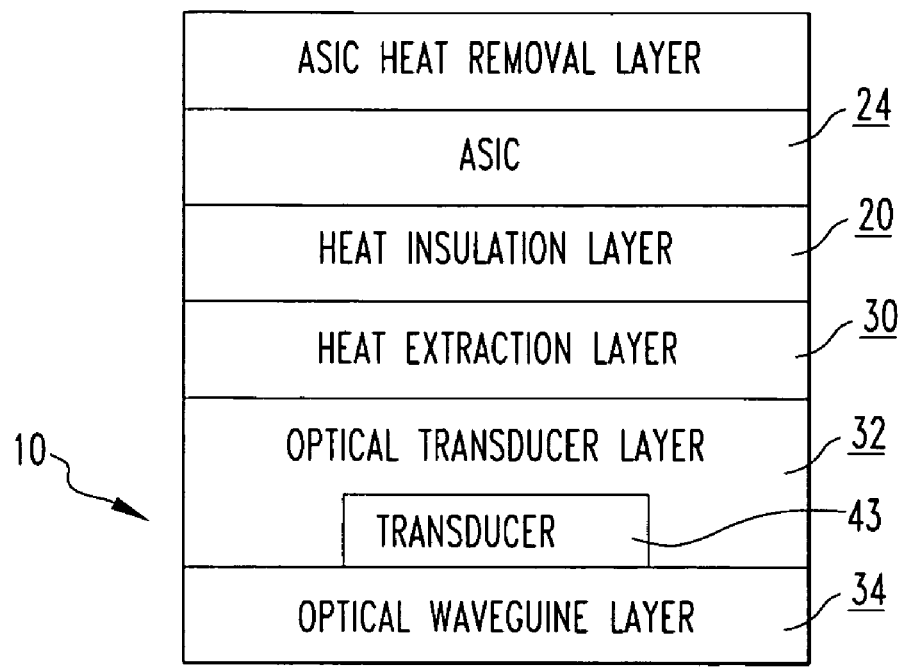
FIG. 15 is a block diagram of the present invention.
Figure 16:
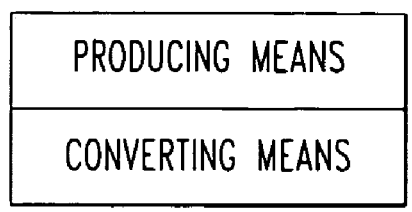
FIG. 16 is a block diagram of the present invention.

Referring now to the drawings wherein like reference numerals refer to similar or identical parts throughout the several views, and more specifically to FIGS. 3 and 15 thereof, there is shown a data link 10. The data link 10 comprises an ASIC 24 having connectors, such as input/output pins 36. The data link 10 comprises a heat insulation layer 20 in contact with the ASIC 24 preferably having holes 19 in alignment with the input/output pins 36. The data link 10 comprises an optical transducer layer 32 having a plurality of transducers 43, with each transducer of the plurality of transducers 43 in alignment with a hole in the insulation layer. Each transducer is preferably in communication with the ASIC 24 and preferably in communication with an input/output pin. Each transducer converting optical signals to electrical signals or electrical signals to optical signals. The data link 10 comprises an optical waveguide 34 layer having a plurality of waveguides 34 for carrying optical signals. Each waveguide 34 of the plurality of waveguides 34 in optical communication with a transducer, the optical waveguide 34 layer adjacent with the insulation layer.

Preferably, each transducer includes a VCSEL 18, photonic sensor 40, or both. The data link 10 preferably includes a heat extraction layer 30 disposed between the optical transducer layer 32 and the heat insulation layer 20. The heat extraction layer 30 has holes 19 which align with the holes 19 of the heat insulation layer 20. Preferably, the data link 10 includes a top which is pressure loaded to create proper seals in the data link 10. At least one of the waveguides 34 is preferably used for timing synchronization.

The present invention pertains to an apparatus for data. The apparatus comprises a first ASIC 44. The apparatus comprises a second ASIC 46. The apparatus comprises a plurality of optical waveguides 34 connected to the first ASIC 44 and the second ASIC 46 through which data and timing to synchronize the data in the waveguides 34 is transferred between them.

Preferably, each waveguide 34 of the plurality of waveguides 34 has a first end and a second end. Each end of each waveguide 34 has a laser 48 to send data as optical pulses to the waveguides 34 and a sensor 50 to receive data as optical pulses from the waveguide 34.

The present invention pertains to a method for transferring data. The method comprises the steps of producing electrical signals by an ASIC 24 preferably having output pins 36. There is the step of sending the electrical signals from the ASIC 24 preferably out through the output pins 36 to transducers 43 of an optical transducer layer 32, where there is a heat insulation layer 20 in contact with the ASIC 24 preferably having holes 19 in alignment with the input/output pins 36 through which the electrical signals communicate from the output pins 36 to the transducers 43. There is the step of converting the electrical signals to optical signals with the transducers 43. There is the step of sending the optical signals from the transducers 43 to waveguides 34 of an optical waveguide 34 layer adjacent with the optical transducer layer 32.

There is preferably the steps of receiving the optical signals at a second ASIC 46, and converting the optical signals into electrical signals at the second ASIC 46.

The present invention pertains to a method for transferring data. The method comprises the steps of receiving optical signals from an optical waveguide 34 layer in contact with an optical transducer layer 32. There is the step of receiving electronic signals from a photonic sensor 40 device which converts the optical signals to electronic signals of the optical transducer layer 32 through the input pins 36 of the ASIC 24, where there is a heat insulation layer 20 in contact with the ASIC 24 having holes 19 in alignment with the input pins 36 through which the electrical signals communicate with the photonic sensor 40 device to the ASIC 24 input pins 36, the photonic sensor 40 converting the photonic signals to electronic signals.

There are preferably the steps of producing electrical signals at a second ASIC 46, converting electrical signals to optical signals at the second ASIC 46 and transmitting the optical signals to the optical waveguide 34 layer.

The present invention pertains to a data link 10. The data link 10 comprises an ASIC 24 and an optical transducer layer 32 which converts optical signals that the layer 32 receives into electrical signals for the ASIC 24 and converts electrical signals from the ASIC 24 into optical signals. The ASIC 24 does not use an encryption architecture. The ASIC 24 uses a direct parallel modulation bus and has a separate clock photonic path that uses a feedback loop to determine delays of individual paths for timing alignment.

The present invention pertains to a data link 10. The data link 10 comprises an ASIC 24 having a clock with a working range, where the clock's timing is controlled by the ASIC 24 receiving known data and centering any delay for the clock to the center of the clock's working range. The data link 10 comprises an optical transducer layer 32 which converts optical signals that the layer receives into electrical signals for the ASIC 24 and converts electrical signals from the ASIC 24 into optical signals.

The present invention pertains to a data link 10. The data link 10 comprises means for producing electrical signals in parallel. The data link 10 comprises means for converting the electrical signals to optical signals in parallel and transmitting the optical signals in parallel, and converting optical signals to electrical signals in parallel and providing them to the producing means. The converting means in contact with the producing means in parallel.

The producing means preferably includes an ASIC 24 with an ASIC 24 heat removal layer on top of the ASIC 24, and a heat insulation layer 20 disposed on the bottom of the ASIC 24. The converting means preferably includes an optical transducer layer 32 with a heat extraction layer 30 on top of the optical transducer layer 32 and in contact with the heat insulation layer 20, and an optical waveguide layer in contact with the optical transducer layer 32.

In the operation of the preferred embodiment, to build a photonic data link 10, the following steps occur:

Modify the ASIC 24 CMOS design to reduce power consumed by the external drivers.

The current ASIC 24 FDP drivers consume ~300 mW per driver at 2.5 Gbps. The size of these devices are reduced to be that of the internal cell to internal cell driver consuming <10 Mw.

Insulate the CMOS from the VCSEL 18 to preserve the VCSEL 18 and maintain specific LAMBDA.

One of the primary reasons that VCSELs 18 have not been direct bonded previously to CMOS is the heat from the CMOS would destroy the VCSEL 18.

This problem has been addressed with an insulator 20 and a separate heat extraction system for the VCSEL 18.

Figure 1:
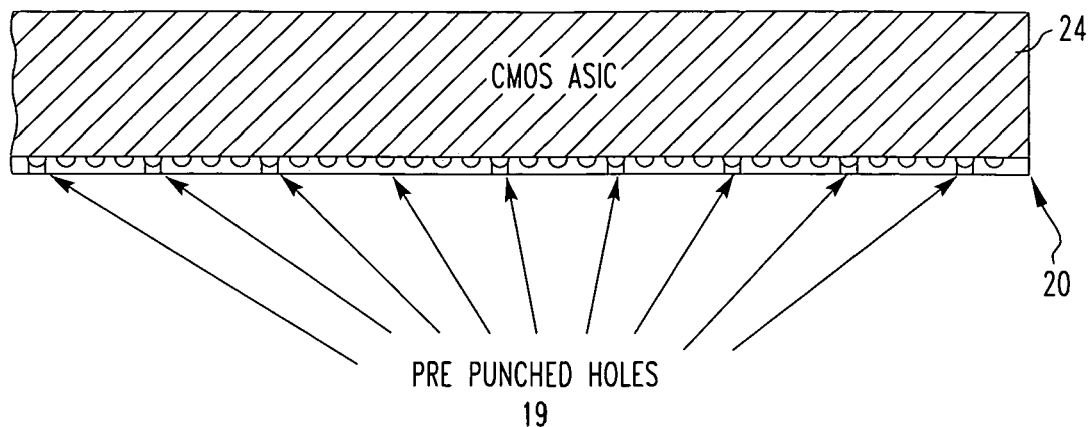
FIG. 1 shows an insulator with a CMOS device of the present invention.

FIG. 1 presents the MICROLAN® insulator 20 which is composed of tiny air filled bubbles captured by Gore-Tex®. (This may be purchased from W. L. Gore.) This insulator 20 is on the bump side 22 of the CMOS device 24. There are pre punched holes 19 where connections are to be made with the VCSEL 18. Since temperature variations will cause Lambda variations, this is the first step in maintaining a stable VCSEL 18 temperature.

Remove the Heat from the VCSEL Layer 32

A temperature barrier 26 exists between the CMOS and the VCSEL 18, but is left with the heat generated by the VCSEL 18. To remove this heat, a heat removal layer, such as a carbon sheet layer 28, is added which is comprised by several thin sheets of horizontally valance bonded carbon compound that passes heat horizontally.

Figure 2:
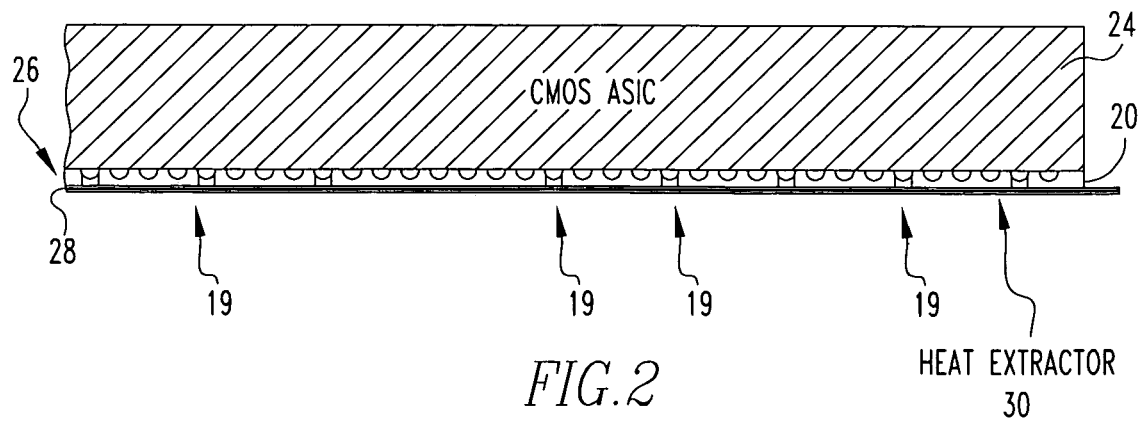
FIG. 2 shows the heat extraction layer with the CMOS device.

This heat extraction layer 30 can be seen in FIG. 2. This heat extraction layer 30 is modified as needed to keep the VCSEL 18 device temperatures constant.

Creating the VCSEL Layer 32

The VCSEL layer 32 is simply a layer in the device which supports the VCSELs 18/sensors 50 and their relationship to the CMOS connections and the board polymer wave guides. The I/O pins 36 on the CMOS device 24 are created first, and then the VCSEL layer 32 will align the electric connections of the CMOS and the VCSEL 18/sensor 50, with the final alignment to satisfy the alignment of any given VCSEL 18 with the polymer waveguide 34 on the board.

The VCSEL layer 32 may be made of FR4 or some other material that will hold the VCSEL 18 for this finite positing.

In Operation

The input pins 36 of the VCSEL 18 will be aligned with the DP driver 38 on the CMOS. This connection will allow the polarity change on the DP to cause the VCSEL 18 to make a phase shift of the lambda it is producing.

The phase shift is accurately transported to the photon sensor 40 at the receiving station 42 via the polymer waveguide 34. The photon receiver interrupts the phase shift and causes a change in polarity to its pins 36 attached to a CMOS array.

So putting it all together in FIG. 3, ASIC1 44 sends data to ASIC2 46 on the waveguide 34 links (1). ASIC2 46 sends data to ASIC1 44 on the waveguide 34 links (2), and clocks are "exchanged" on the wave guide link (3) between the first clock 80 and the second clock 82. The term "exchanged" in this scenario infers a bidirectional clock link. Both ends of the waveguide 34 share a laser 48 and sensor 50. (This may be separate waveguides, a waveguide with different lambdas, or one waveguide, one lambda.)

The clock is used to synchronize the data lines as in conventional electrical interfaces. With this type of clocking, the sending device sends the clock and the data synchronization to the clock. All data signals shall arrive in parallel first, and then the clock will enable the input register to capture the data it has received.

Figure 5:
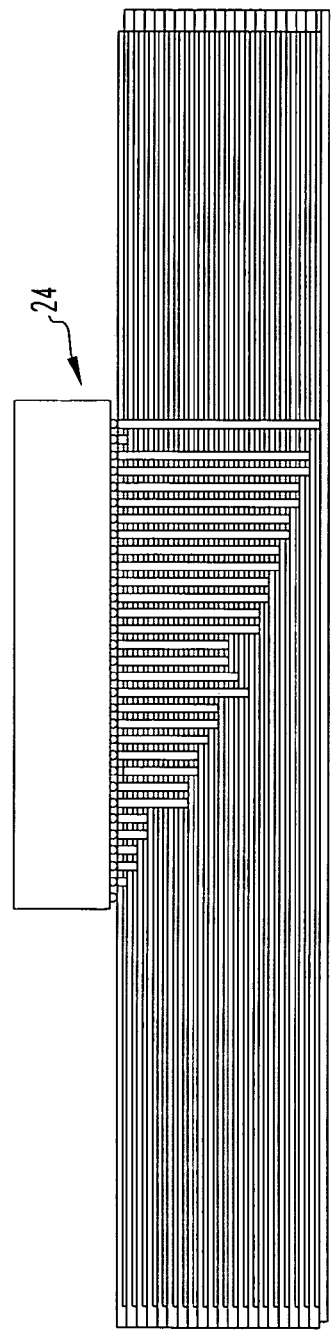
FIG. 5 shows a standard UBGA on a multi-layer board.
Figure 6:
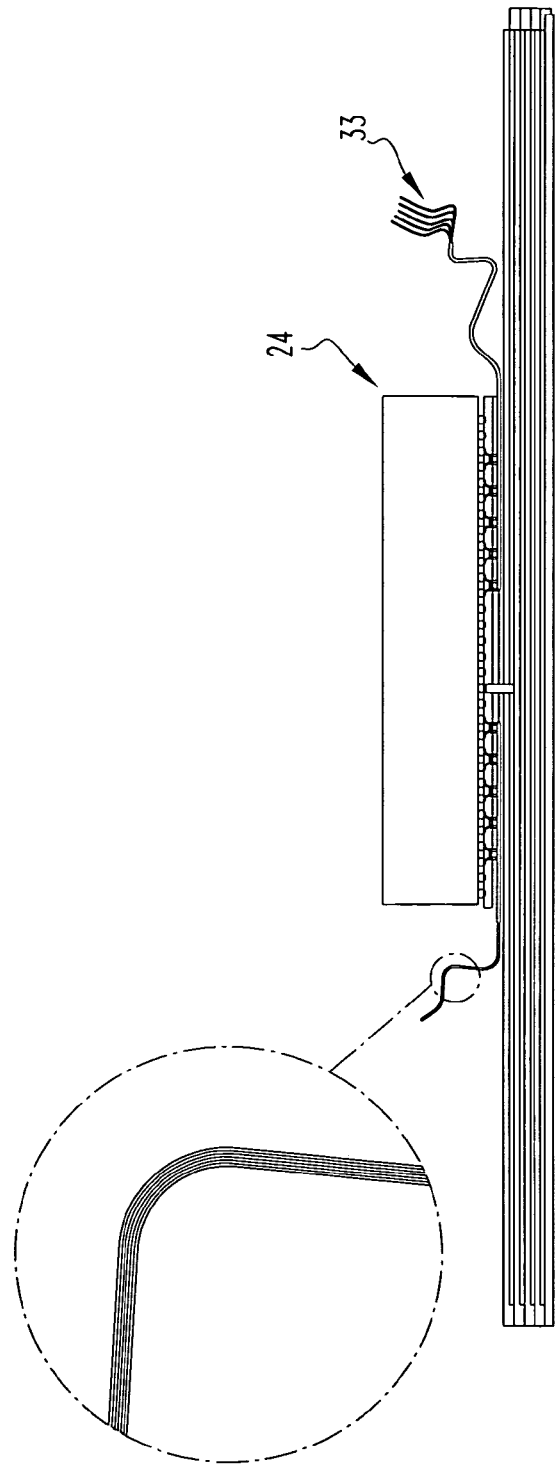
FIG. 6 shows the ASIC with photonic alleys forming data links.

FIGS. 5 and 6 depict the same device, but with FDP in FIG. 5, and OpticAlleys in FIG. 6. FIG. 5 demonstrates the layers required to support the high-speed differential pairs. FIG. 6 depicts the OpticAlleys in separate individual paths leaving the right side of the drawing, and single waveguide 34 multiple lambdas leaving the left side of the drawing.

FIG. 6 shows a device which uses photonic allies for the data links 10. The data links 10 can be individual polymer waveguides 34 as demonstrated on the right, or, as shown on the left, WDM on a single waveguide 34 with multiple lambdas. (Note: The number of layers, channels per waveguide 34 and number of VCSELs 18 are for demonstration purposes.)

Figure 7:
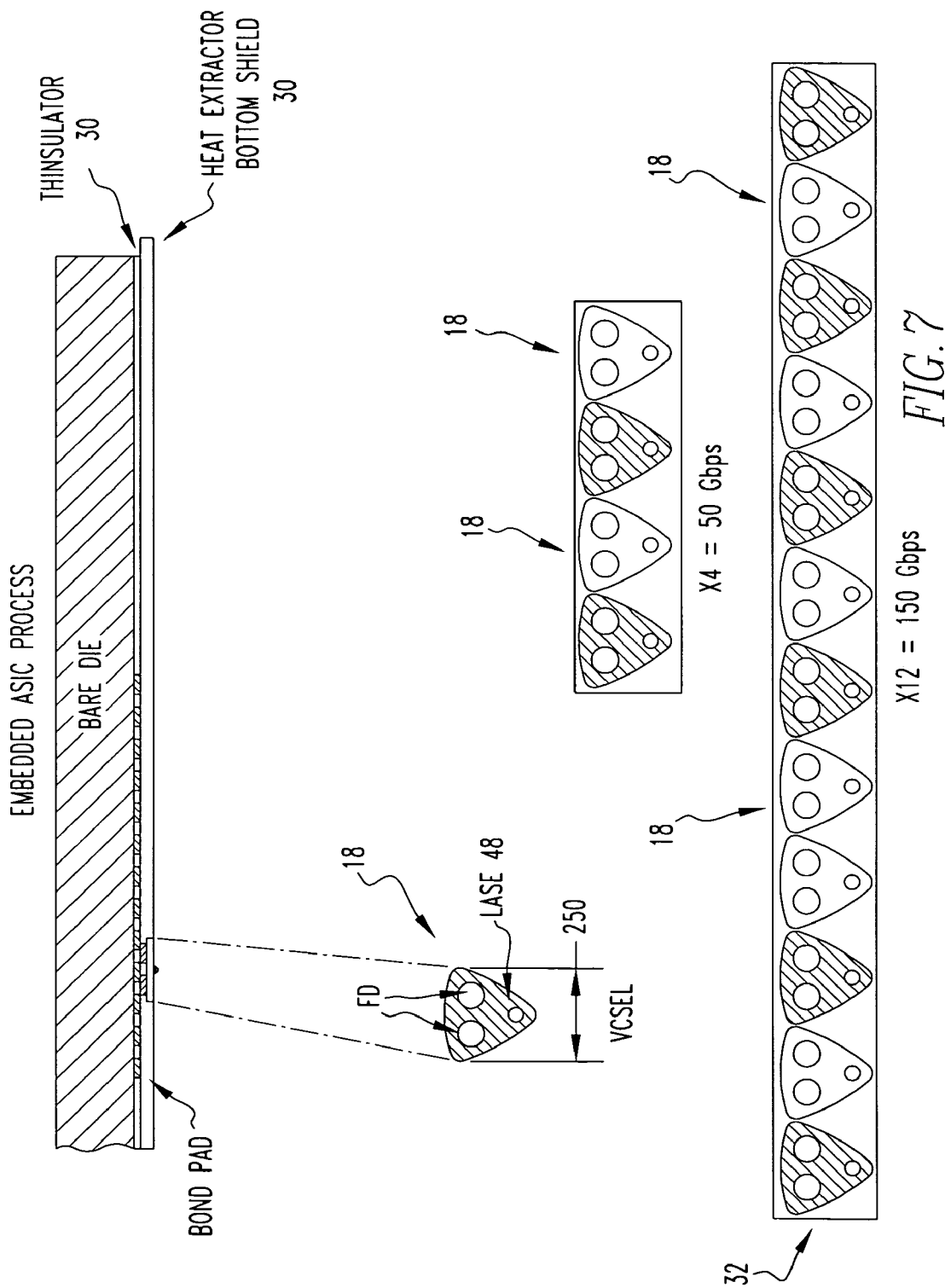
FIG. 7 shows the VCSEL layer.

In regard to FIG. 7, the VCSELs 18 are added in a similar manor as the package. The bond pads 52 are used for the connection to the VCSEL 18/sensor 50. The Gore insulation layer is new as well as the heat extractor. While there are several methods of heat extraction, in the preferred embodiment, a number of carbon slates stacked provide heat movement horizontally. Depending on the number of VCSELs 18, the extraction layer may need to be connected externally for keeping the VCSELs 18 at a constant temperature.

The heat extraction layer 30 in this instance is also the alignment stabilizer for the VCSELs 18.

Details:

(Many of the following procedures will be automated in a production environment.)

Figure 8:
FIGS. 8 and 9 show an FPGA of the present invention.
Figure 9:
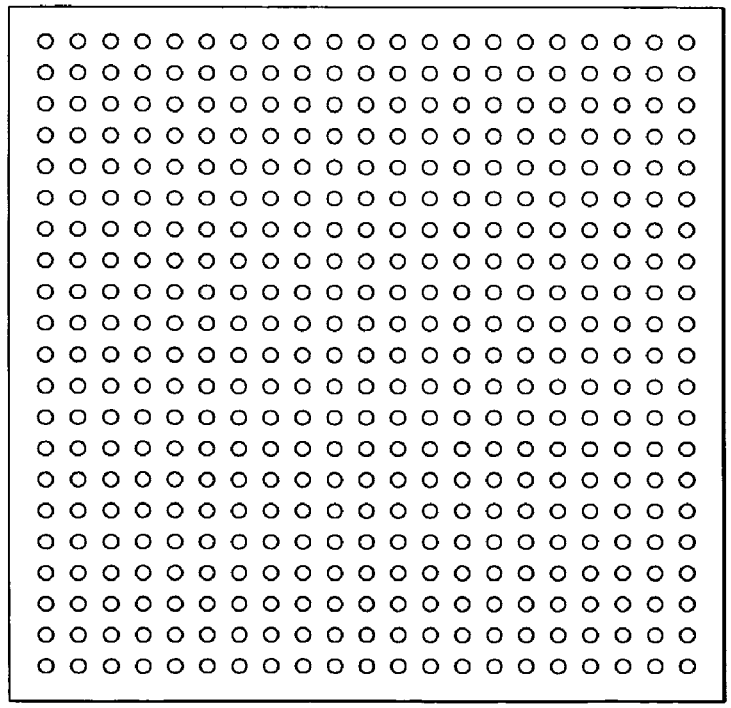

Physical Description:

As shown in FIGS. 8 and 9, the formation will start with a small FPGA and use the existing drivers. The FPGA is an Altera atix EP1S10F484. This device has multiple 1.25/2.5 Gbps DP for ingress and egress. The exact location of the HS-I/O pins 36 are located and the distance between leads for the VCSEL 18 are examined to see if the alignment is direct or shifted requiring additional steps. For this device, it is assumed they are aligned.

It is now time to place the VCSELs 18 in the alignment jig made using a graphic image of the pin-out of the FPGA. The jig has the slots in the base for the number of VCSEL 18 I/O to be used. Since the VCSEL 18 configuration is a X4, and 160 Gbps ingress and egress are needed, device sets are used. Due to the flexibility of the exit strategy (polymer waveguide 34) the device location can be anywhere the pins 36 from the FPGA require. Part of the noise immunity is due to the very short distance the device DP will operate (less than 100 um). With the VCSELs 18 in the jig with the ingress/egress facing the jig, the sheet of FR4 is laid on top. The FR4 is UV cured. (There are alignment pins 36 in 4 locations that are also placed in the jig that will be used for um alignment in the socket base.)

Note: In a device designed for this technology, the I/O drivers will be reduced in size and made as a CMOS driver is if the next receiver were on the same silicon surface. This reduces the space and power required for the driver.

Since this is a critical part of the MTBF, a torque spec is exhibited to insure proper contact for the compression version. (This may also be a sealed unit with today's soldering techniques.)

Figure 14:
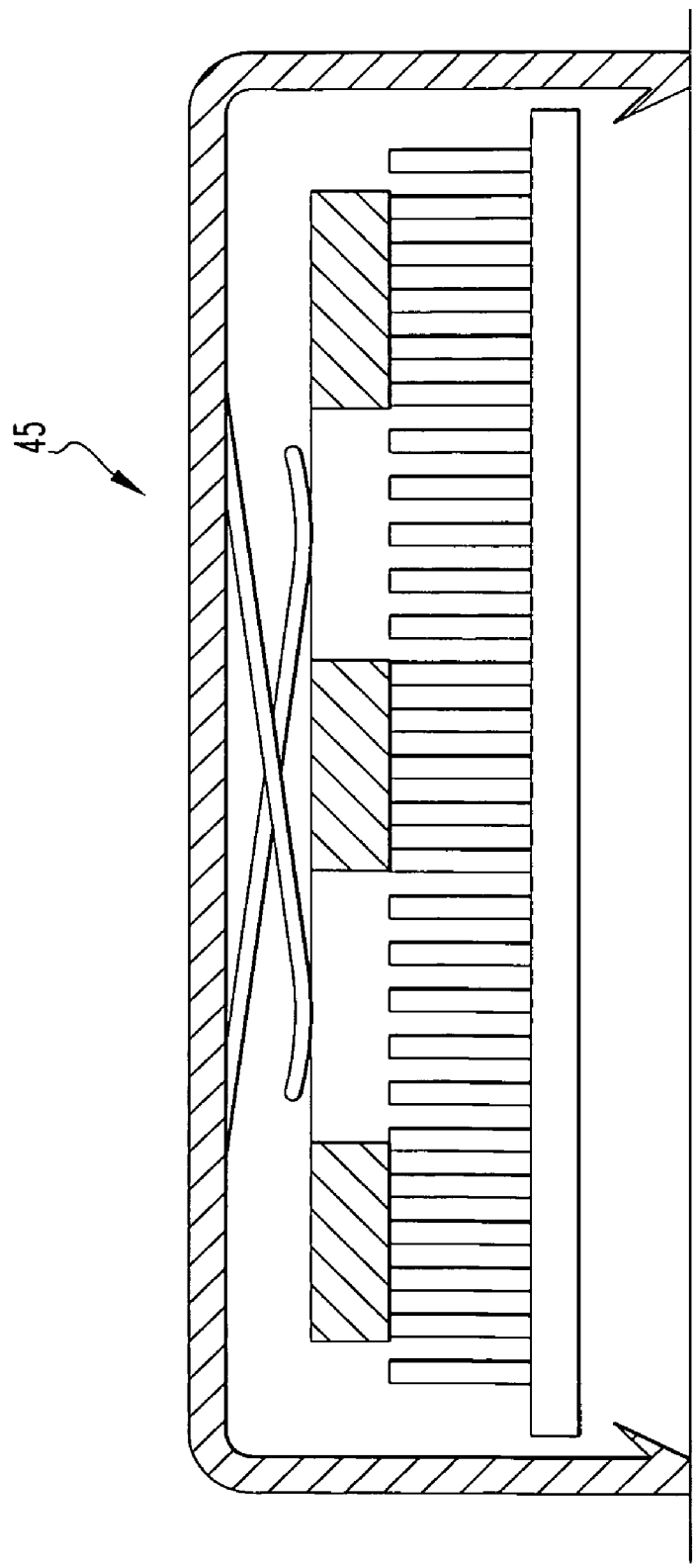
FIG. 14 shows an alternative view of a compression device to the present invention.

As shown in FIG. 14, the compression device 45 is now the total responsibility of the spring steel in the mounting clip. This is a very acceptable method of compression as demonstrated by the Control Data Cyber 205 supercomputer.

The majority of all optical interfaces have included some sort of encryption such as SERDES. The Encryption system insures that the data received can be interrupted correctly by encoding a clock with the data in encapsulation allowing recovery through a clock alignment of the data on the serial interface. The present invention does not use a SERDES or other encryption architecture, it uses a parallel, direct modulated interface that can be a bus and has a separate clock photon path that uses a feed back loop to determine delays of the individual paths for timing alignment. This allows for compensation of drift due to thermal variations. While the VCSEL 18 may be kept at an operating temperature well within their tolerances, the difference of 10 degrees at 10+Mbps could cause data integrity challenges if this compensation were not included.

The present invention has a method of driving the VCESL through a direct modulation technique that allows direct connection to the drivers and receivers to the I/O of the compound device. There is more than one method of driving and recovering data in a direct-modulated VCSEL 18, a direct drive is used that yields a detectable frequency shift or add an Oxide Doped reflector for modulation of the output. The current selection will be in the 850 to 970 nmeter range.

At the receiving end, the sensor 50 will detect the frequency shift and cause a "1" or "0" to be implemented into the receive gate. The receive gate will make the output active through a gate clock.

This is where the parallel alignment from the photon paths are set. Each path may be modified through program control, or the gate clock may be programmed controlled to account for different variations in the path.

For a case where the polymer waveguides 34 are within the specified tolerance of length (1 mm at 10 Gbps in the initial product), only the clock need be adjusted. This will be done through a technique used in memory called shmooing which is done by sending known data, moving the clock through its adjustment capability, and then centering the delay for the clock to the center of the working range.

For a case where the polymer waveguides 34 are not within the specified tolerance range a second method of alignment is used such as the individual bit line method needed in complex-pathing scenarios. In this method, a similar pattern of known data is used with a clock centered on the receiving data. This time, the data is varied through programming the delays in each bit path. This alignment can be resolved chip-to-chip, or through a serial service port such as photonic JTAG.

Insulation Material

The next step is to take the insulation material (manufactured by Gore) used to protect the VCSEL 18 from the CMOS heat and use a template to punch holes 19 for the appropriate bumps to make contact.

Using this same template, make the heat dissipation material have holes 19 in the same locations at the point of manufacture. These holes 19 will then be filled with a conductor such as solder for connection to the VCSEL 18.

Note: (This step is needed unless a material is used that passes electrons vertically while transferring heat horizontal plane. When latter material is used, no alignment is necessary for this element of the device.)

Create a Clock Alignment System on the Receiver

In just about every parallel system since the 70s, parallel transfers have included a clock alignment system. Due to variations in drivers, LAN irregularities, and tolerances in the receiver, data does not always arrive at the same time. VCSEL 18 and polymer waveguide 34 technology have made these variations very small, but can still exist. Therefore, the data lines are shmoo through a built in algorithm and the ability to vary the clock timing in small increments. Very small deltas to very large deltas can be compensated depending on need.

The algorithm to align the data has 2 stages. There is a coarse alignment and a fine alignment depending on the variation, either or both may be used.

Figure 3A:
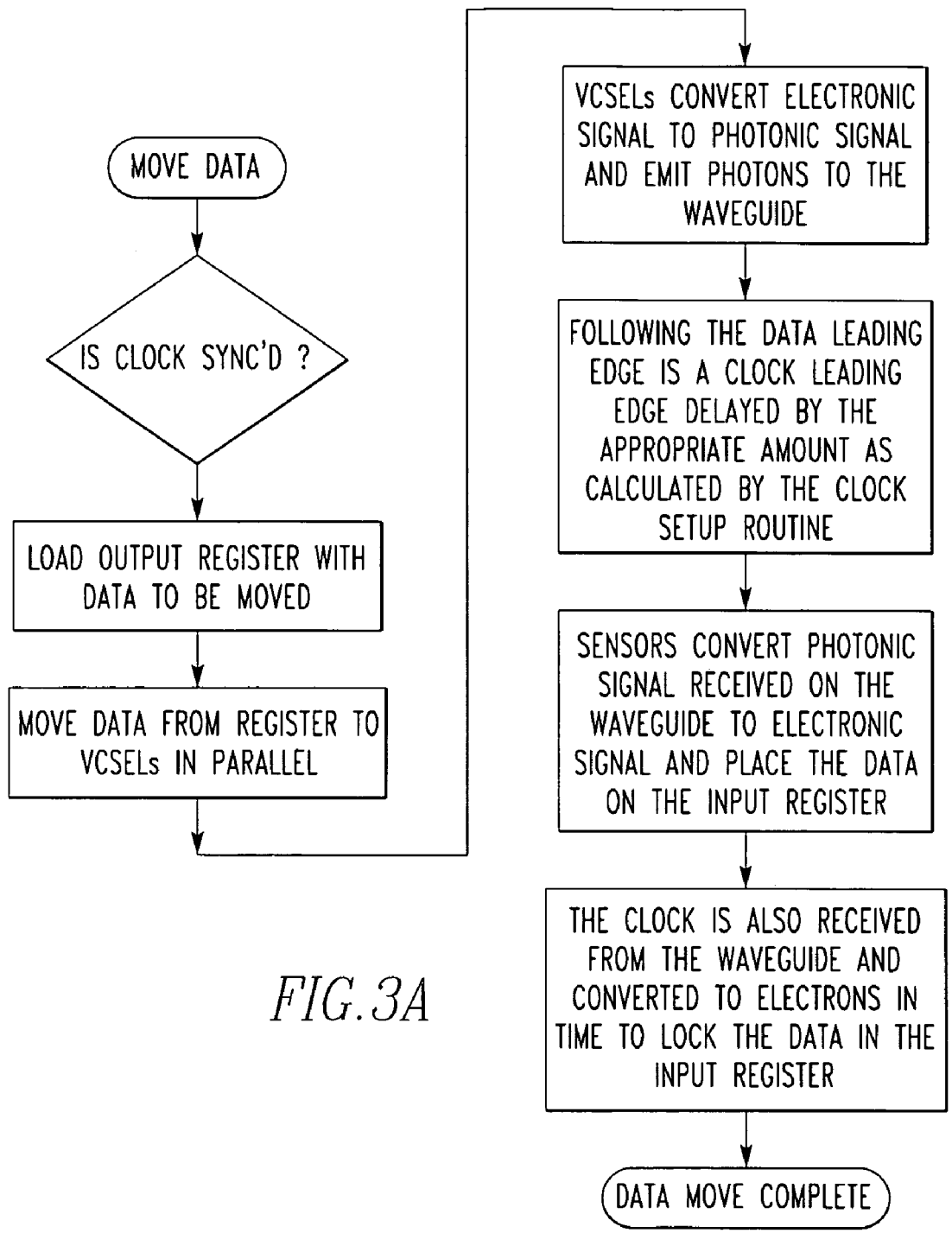
FIG. 3*a* is a flow chart regarding the method of the present invention.
Figure 3B:
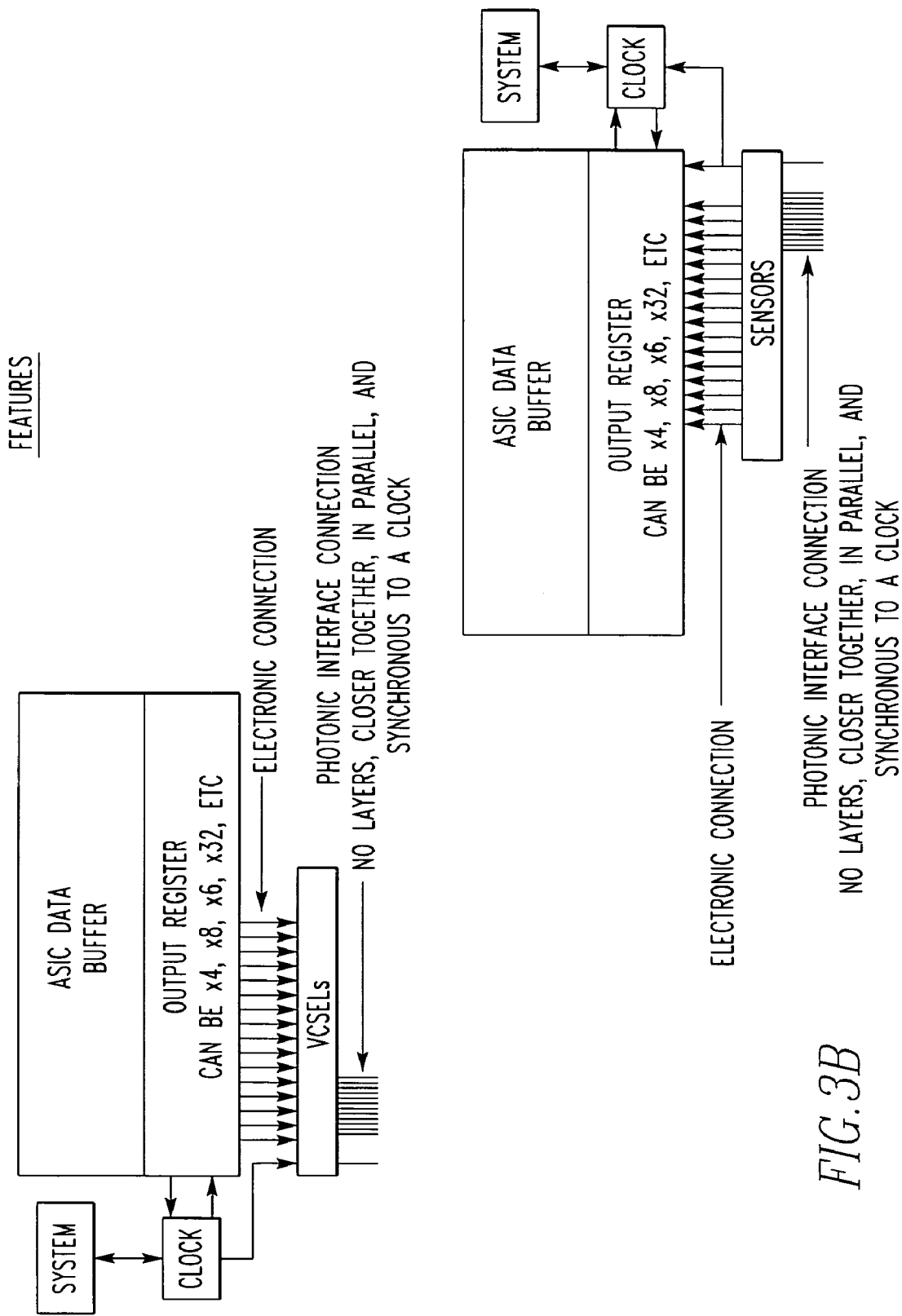
FIG. 3*b* is a block diagram regarding the data and timing of the present invention.
Figure 3C:
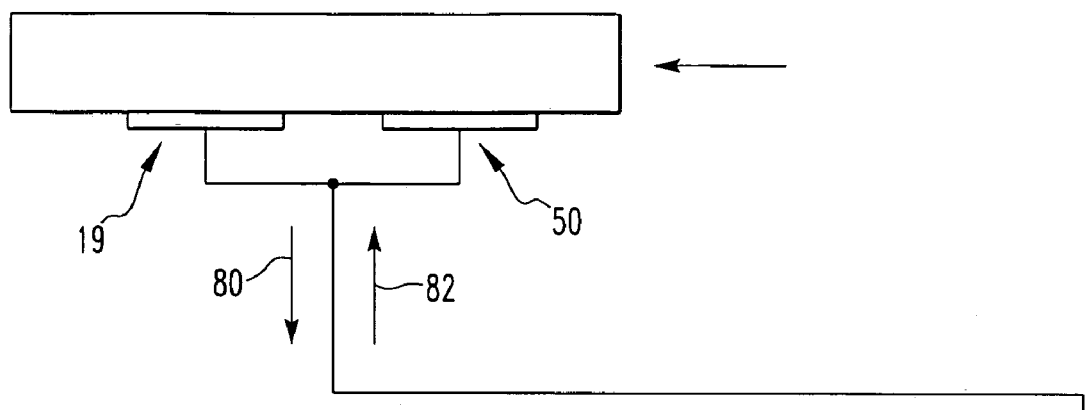
FIG. 3*c* shows the clock timing relationship between the first and second ASICs.
Figure 3C:
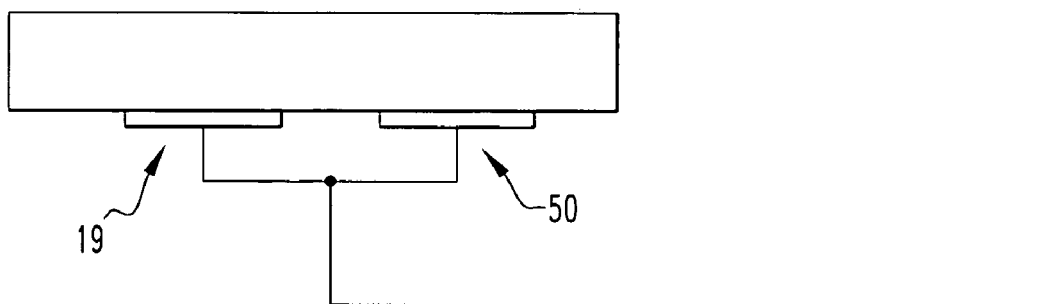

The coarse alignment assumes all data leading edge timings are within the tolerance of 30% of the duty cycle. That is, for example at 10 Gbps data rate, the duty cycle is 200 psec and the leading edge of all the parallel data lines will have a maximum of 60 psec delta. A known data sequence will be sent to the receivers along with the clock. The clock will then be varied in its arrival time at the receiver gate until the data received matches the data sent. It will mark this delay time and then continue is delay until the sample data is no longer correct. It will mark this delay, and then set the delay for operation at the midpoint of the delta for correct data. See FIGS. 3a, 3b and 3c.

Figure 4:
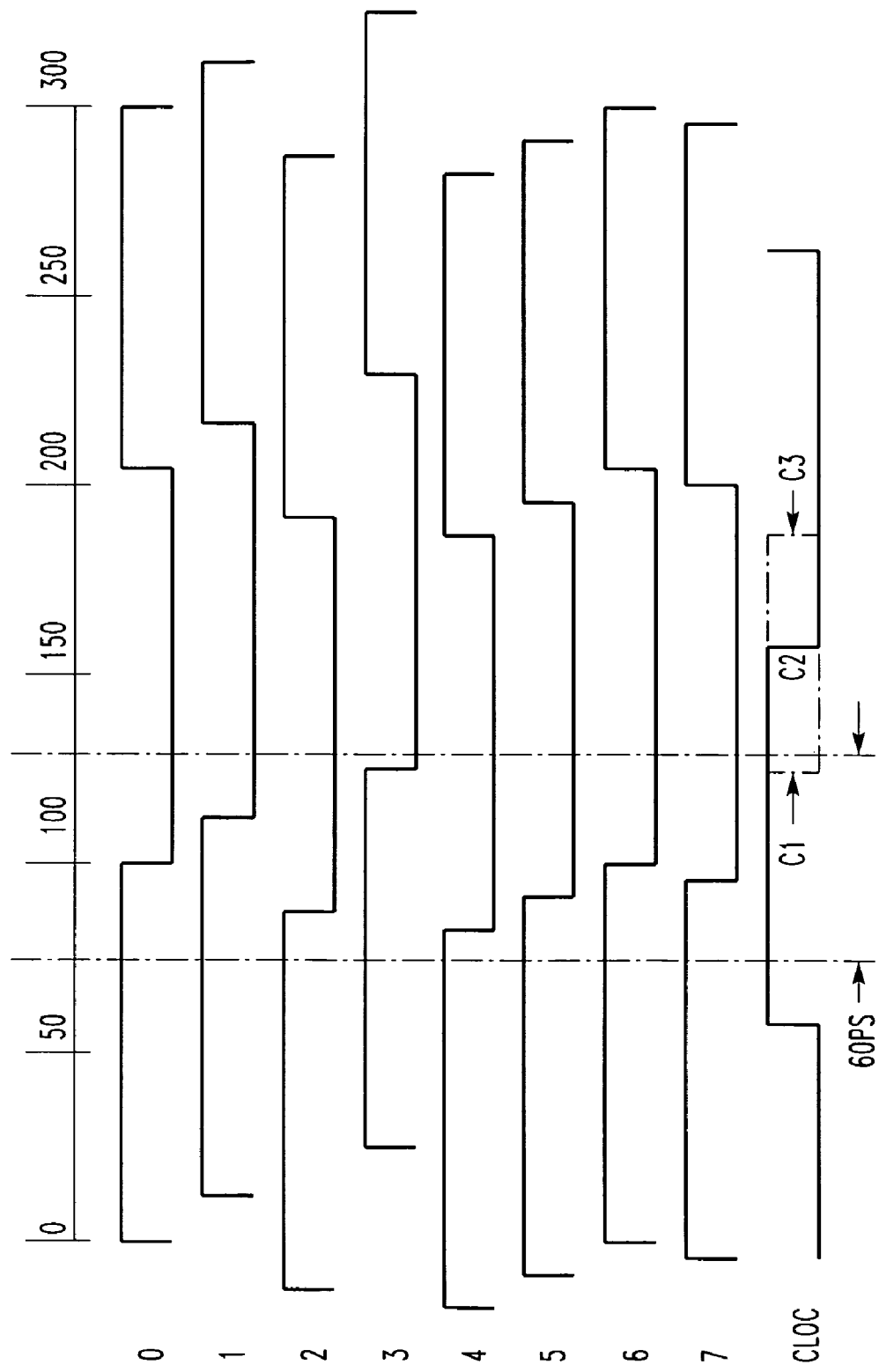
FIG. 4 shows the block timing in regard to a preferred embodiment of the present invention.

FIG. 4 demonstrates the 30% duty cycle with the vertical doted lines denoted by the 60 picoseconds notation. C1 is the first correct data time, C3 the last correct data time, and C2 the clock time set for operation.

For data lines that are outside of the 30% delta, the data lines will be delayed individually to get them within the 30% delta. This will be done in a similar fashion to the coarse clock alignment system. The system clock will varied, but now the data on the lines will be a predetermined bit sequence per test line. The line under test will have the predetermined data sequence, while the other lines are all "1"s. The amount of delay needed to bring that bit line into the tolerable delta range is now found. Once these have been corrected, the course alignment will take place. This procedure will take place each time the system is initiated, and if there are any sensed changes in overall temperature environment.

Create a Mechanical Alignment System

Since tolerances are in the micrometer range, it is important that the alignment reflects this in design and capability. MSA connectors have been used for several years now using alignment pins 36 to insure the fiber or waveguides 34 are aligned in connecting these transport entities together.

Assuming a pin system with similar pin dimensions, the pin would align the socket to the board. This would give positioning for the waveguides 34 on the board by referencing the pin. The pins 36 may also be required at the device layer levels as well, depending on socket alignment tolerances.

Develop a Board Build Process

Since it is the goal to eliminate all electrical signals on the PCB, it no longer is a PCB. It can be clear Plexiglas, a metal sheet, and FR4 composition, a poly carbon met, or no board at all.

The board will preferably be fabricated with the power and ground connections included. The arrays will be pinned, and lay the waveguides 34 on the surface. The connections will be defined that must be made by the wave guides and pass them to Optical Cross Link in eastern Pennsylvania to be designed and built.

Board and Backplane Integration

Backplanes are to interconnect the boards in a system. There are two backplanes today, a passive signal backplane, and a power backplane. The signal backplane is similar to a board, with the exception of any power being imbedded.

This makes precedent for developing a backplane system that is fiber plugs like the MSA connector, and power. Since all of the signals on the board are now on waveguides 34, the interconnection between the boards may be fiber optic plugs, no electric signal connectors.

The Board Preparation:

The board which may be made of FR4 shall be prepared in the following way. Any electrical connections that must be made through the PCB will be laid out in the standard manor for PCBs. (The waveguides 34 are to be imbedded at this time as well if a surface plane of the waveguides 34 is not desirable.) The addition of holes 19 at the device site will be added for the non-bonded device mounting system. For the bonded mounting system, these holes 19 will not be necessary. (The types of mounting systems will be discussed later.)

The next step will be to accurately deploy the polymer waveguide 34 to the surface of the board.

Figure 10:
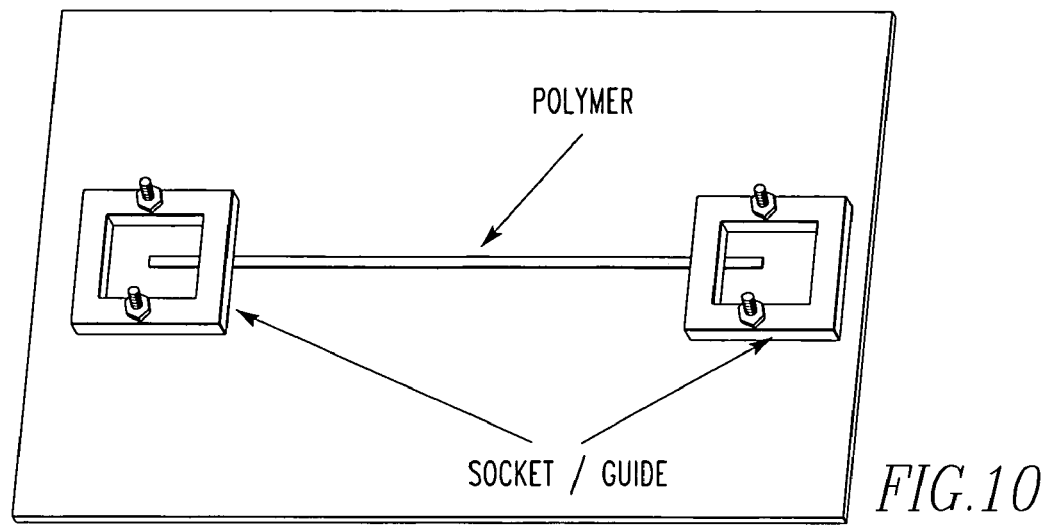
FIG. 10 shows a Plexiglas board of the present invention.

As shown in FIG. 10, a Plexiglas board was used for demonstration purposes. In this scenario, all connections, with the exception of power and ground, will be photonic. The polymer waveguide 34 has the ends cut at a 45 degree angle that acts as a mirror and directs the light at a perpendicular angle to the waveguide 34. (This process can also be embedded in a PCB.)

Figure 11:
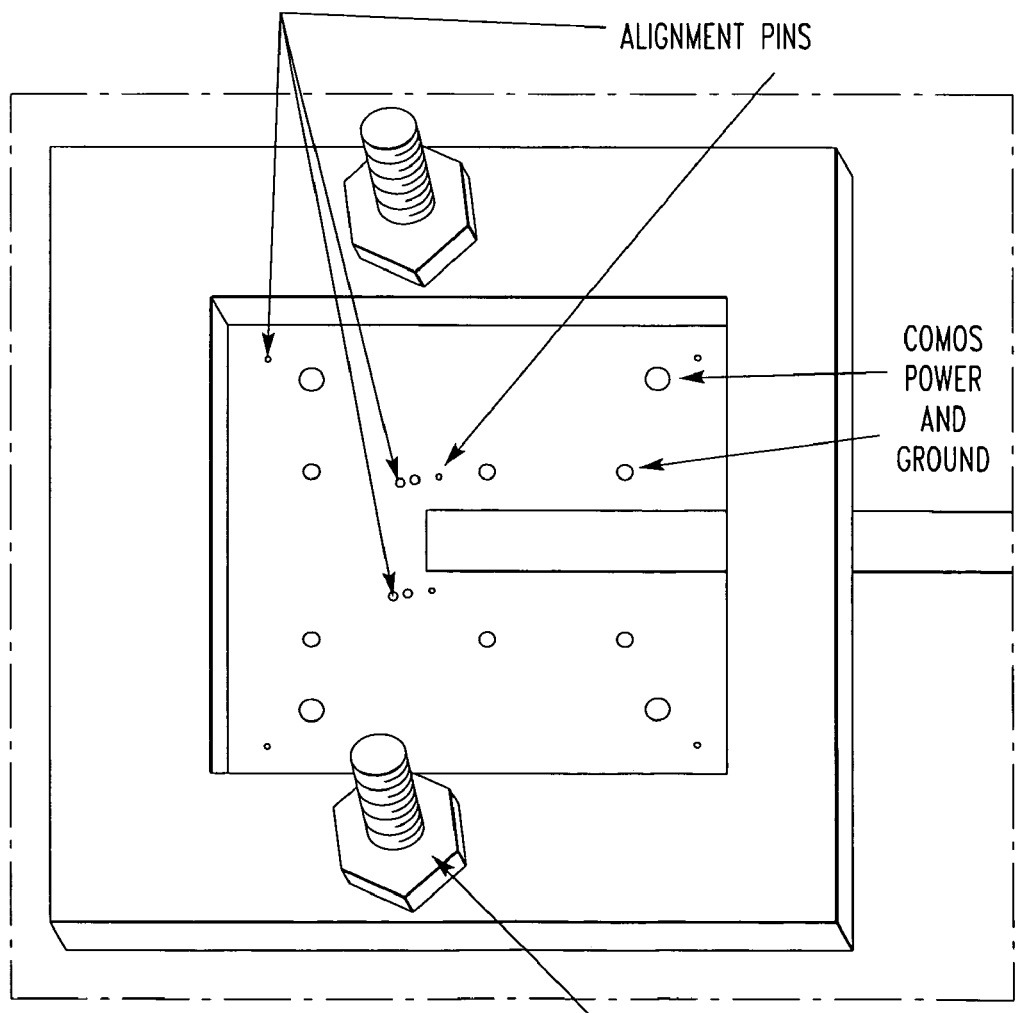
FIG. 11 shows a socket of the present invention.
Figure 12:
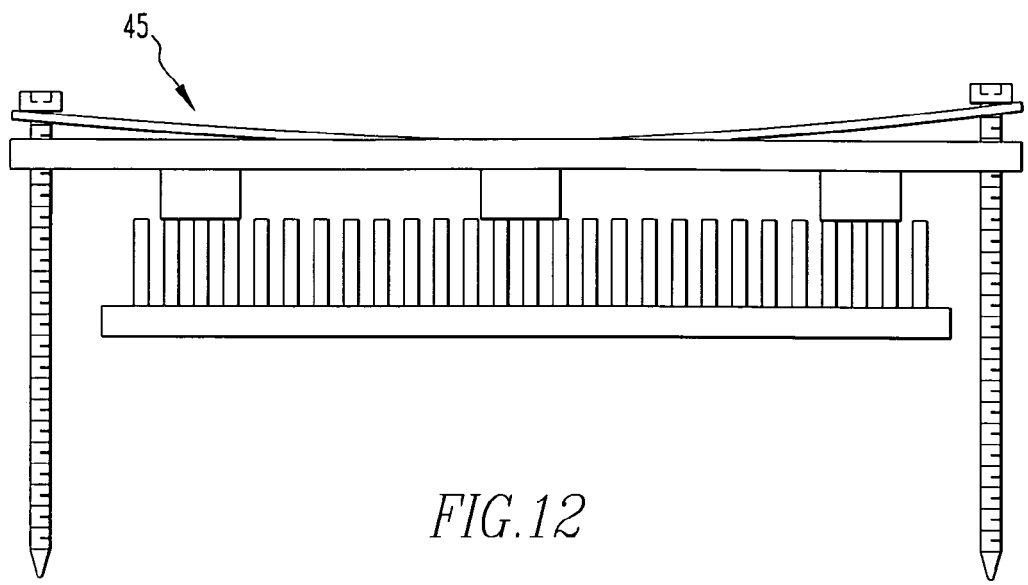
FIG. 12 shows a compression device for the present invention.
Figure 13:
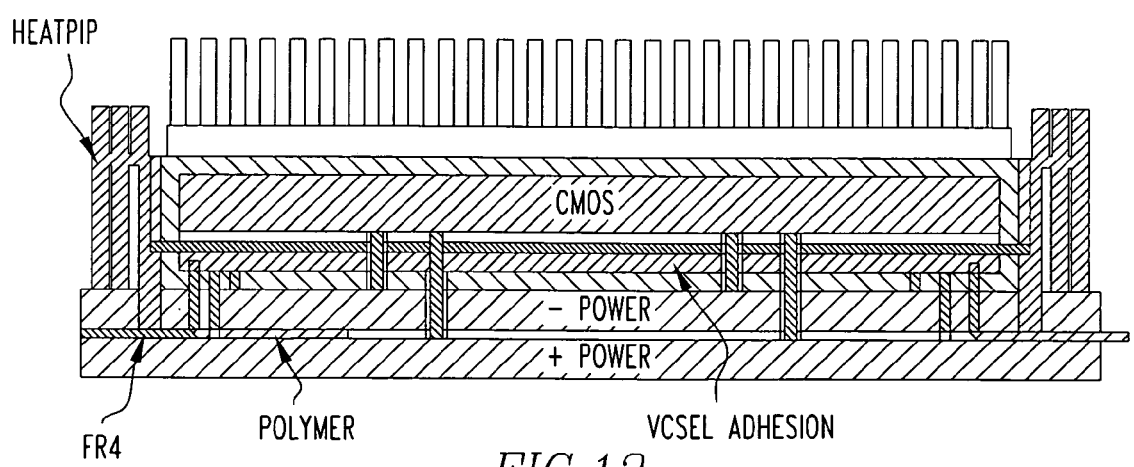
FIG. 13 shows the present invention without the compression device.

In FIG. 11, the socket detail is presented. The alignment pins 36 are those used in the MSA standard connector today. They are preferably mounted on the board with alignment holes 19 in the CMOS, Thermo Barrier, Heat Extractor, and VCSEL layer 32 mold. (For the bonded device the pin would preferably be part of the device.) The power and ground for the CMOS device 24 would be separately sourced, preferably at the socket, to prevent drift.

The device is now ready to be mounted. For this phase, it is assumed the device is a compression mount, and therefore the elements of the device are separate and alienable via the alignment post on the board.

The first element to go into the socket is the VCSEL layer 32. This allows the VCSEL 18 to be within 0.5 mm of polymer waveguide 34 surface eliminating the need for a lens.

The second element is the heat evacuator making direct contact with the VCSEL 18 and the independent heat sink. This also makes the electrical connection between the VCSEL 18 and CMOS element.

Next is the GORE insulator 20 that keeps the two units form exchanging heat and allowing the VCSEL 18 to work in this close proximity of the CNMOS element. This is followed by the CMOS array. All are aligned as they slip down the alignment pins 36.

Next is the CMOS heat-sink shield. This element may be made of aluminum or some other material displaying similar properties in heat extraction and EMI reduction.

The final step is to add the compression cap that not only seals the COMS heat sink to the socket casing, but compresses the VCSEL 18 heat extractor layer electrical pass through to connect the COMS to VCSEL 18 electrical signal paths.

Physical Description:

Starting at the physical level, there is a high-speed FPGA, ASIC, or Microprocessor. They will typically be operated at 2.5 Gbps over full differential pair. The drivers are made to drive 20" and consume 300 mw per pair. FPGAs may have >400 HS differential pairs requiring up to 120 watts of power. While the power could be reduced by reducing the load on the drivers, the drivers are redesigned for the FDP to be CMOS internal and bring the power from the CMOS output down to the 15 mw level, as they will be driving the VCSEL 18 control direct, or through on onboard multiplexer allowing 4 or 8 to one interface to the attached VCSEL 18. The control is attached to the Cathode of the VCSEL 18 and acts as an OP-AMP allowing the 0.8 V swing of the DP to control the VCSEL 18 cathode current.

Next is the heat isolation. Even though the heat from the CMOS drivers has been reduced 20 to 1, it will still generate enough heat to destroy the VCSEL 18. Ideally, the VCSEL 18 will be kept at 45 to 65 degrees C., while the CMOS could well be over 100 degrees C. A special insulation material is used that isolates the CMOS from the VCSEL 18.

The VCSEL 18 will go through a layout process fixing its location on the compound-device. This will be the process that controls the alignment of the VCSEL 18 with the polymer waveguide 34.

Next is the marriage of the VCSEL layer 32 with the CMOS layer. While this can be put together in several ways, for this particular implementation, the board will be drilled and the socket mounted in place. The polymer waveguide 34 has already been installed on the surface in order to eliminate lenses to accomplish the transfer of the photons to the waveguide 34 from the VCSEL 18. The VCSEL layer 32 is put into the socket cavity; add a layer of material that transfers heat in the x-axis, and electrons in the y-axis. The insulator 20 is then added, and finally the CMOS die. The top electrostatic shield is also the heat sink for the CMOS part of the composite.

Now that the device is in place, a special pressure loaded top is installed and torqued to specification. The torque will make electrical, photonic, heat and static seals for proper chip operation.

Protocol Description:

Until now, the majority of all optical interfaces have included some sort of encryption such as SERDES. The Encryption system insures that the data received can be interrupted correctly by encoding a clock with the data in encapsulation allowing recovery through a clock alignment of the data on the serial interface.

While this has been an accepted method for most optical interfaces today, it requires too much overhead for a chip-to-chip operation. It is not the 25% of the bandwidth that is too much, but rather the generation and recovery of the information that requires too many gates. Therefore, this document presents a method developed to operate the chip-to-chip optical transmission/reception of data without the overhead of encryption of the data being transferred. In fact, the transfer of data is very similar to transfers today of parallel electrical interfaces without some of the difficulties of routing parallel copper on a board. Routing parallel copper with coherent or synchronous parallel lines requires that the lines be the same length, but at the frequencies mentioned, cannot be routed side by side.

The aforementioned OpticAlley transports the data in a parallel with matching lengths of wave guide allowing the data recovery to have a delta in the parallel interface that is easily recovered with standard clock alignment techniques. Since the clock is distributed by the parallel waveguides 34, it is also incorruptible.

Until now, optical interfaces have been treated as a serial link. The reasons were twofold. 1) The serial optical link was at least eight times faster than the electrical information available and 2) parallel data was not feasible due to inconstancies of the transport medium and the device emitters (lasers).

Converting parallel data to serial data thorough a SERDES standard allowed for data and clock recovery and data reliability.

While this is fine for external transfer of data from a machine, it is impractical for a device to device data transfer. It could require several thousand gates to do the SERDES operation on a single optical link. It also requires a 25% overhead in frequency. That is to transfer information at 10 Gbps, with the SERDES overhead; the real speed of the optics must be 12.5 Gbps to yield the 10 Gbps of usable data.

Here, parallel data paths are used. This can be done because: 1) the emitting devices are made in the same process at the same time on a bond strip, and 2) the transport medium is made to have the same loss in all paths with a matched length in each waveguide 34. The VCSEL 18 can be direct driven from a FDP (full differential pair) allowing the interface to appear similar to the electrical interface with less power (30 mW VS 1200 mW), less interference with egress and ingress to the device (elimination of cross talk through parallel travel), and virtually no limit on the distance between the devices.

Start:

The Need:
1. The High-Speed/High-Density market creates the need.
2. A customer that requires the speed and cost reduction.
3. A specification from that customer of the ASIC 24 he needs whether they have designed one yet or not.
4. Work with the customer to create a unity between the ASIC 24 design group, board design group, backplane design group and packaging design group.

The ASIC 24 Design:
1. Design the ASIC 24 according to customer need. (If the design is already done, re-layout the ASIC 24 to eliminate the external I/O drivers.)
2. Implement bar die integration where possible. (Bare die bond pads 52 will align with the VCSEL 18 emulated OP-AMP. If it is packaged first, then the wire bonds have to be routed to the solder balls, and back to the VCSEL 18 outside the package.) For bare die:
   a. Analyze power consumption of the CMOS and the VCSEL 18 to define the CMOS heat extraction and amount of control needed to keep the VCSEL 18 at the desired temperature.
   b. Test first silicon with bed-of-nails.
   c. Install thermo barrier and VCSEL 18 heat extractor.
   d. Characterize combo device.
3. For packaged device, test the device for proper operation.
4. Add thermo barrier. (Gore Insulator 20)
5. Install VCSEL 18 heat extractor with electronic links. (Includes bare die emulated OP-AMP.)
6. Add the VCSEL 18 sheet with the devices mounted if this is a sealed combo device. (If it is not a sealed combo device, the VCSEL 18 sheet is aligned in the socket and the compression is added before test.)
7. Install in shielding socket and run characterization procedures.

The Board Build:
1. Since the board build has been significantly simplified, the board build may or may not have any electrical connections besides power and ground. The board will be built in the standard FR4 process unless there are no signal connections, and then it may not need a board. (The device could conceivably be simply wired to power and ground with a local converter and left hanging, suspended, mounted to a metal plate, or even a pipe containing liquid coolant.)
2. The board can be fabricated with the waveguide 34 as a layer, the waveguide 34 can be added to the surface, or in the suspended method, may us an MSA connector.
3. Characterize the board.

The Backplane Design:
1. Once again, due to the revolutionary design, the backplane/midplane could be eliminated all together as the board interconnects may be all fiber with MSAs or other types of connectors.

System Build:
Once again, due to the OpticAlleys, the system can now be put together in modular form to maintain integrity and meet or exceed those environmental specifications on EMI, RF, and other electrostatic related interference/emission related nuisances.

Operation of the Optical Interface
In today's high-end chip operation, the data is transferred in and out of the high-density device via differential pairs. The data is either encrypted or is synchronous parallel interfaced to the next device in the path for processing the data.

Photonic pathways are an interface similar to the electronic signals with the exception that there are no electrons passed from one device to the next in the data path. Instead, at the egress of the device, electric data is used to shift the phase of the lambda of the VCSEL 18. This phase shift is detectable at the receiving cell and converts it back to an electron polarity shift similar to the differential receiver in a circuit today.

Today's electrical interface is limited to 2.5-Gbps going to 5-Gbps if encapsulation is not used for a distance of 0.5 meters consuming 250 to 300 mW of power. The present invention can drive 12.5-Gbps going to 20 Gbps per VCSEL 18 for a distance of 30 to 300 meters consuming <30 mW. Notice the electronic driver is per differential pair, while the photonic driver is per VCSEL 18. The VCSEL 18 can be assigned a specific lambda and be combined with other 12.5-Gbps signals with different lambdas to form a 50-Gbps or 100-Gbps waveguide 34 of fiber link. 40 2.5-Gbps electronic interface links have thus been replaced with one 5 cent waveguide 34.

A typical modern CMOS ASIC 24 such as a high-speed FPGA or microprocessor can easily have 800×2.5-Gbps pair to interconnect it to the other devices in the data path. Even at half this size, 400 times 250 mW is 100 W of power consumption just in the I/O. This becomes 10 W in the photonic domain.

There are 1600 connections of which any two traveling next to each other in a material such as NELCO 6000, which has a higher dielectric constant FR4, for more than 3.25 inches has the same data. With some simple arithmetic, it is easy to see the number of layers to support this kind of interface will be between 40 and 50 layers.

If this were a photonic interface, it would use polymer waveguides 34 driven directly and WDM allowing the interface to be one layer or on top of the surface and instead of 800 pairs, there would be 40 waveguides 34 on one layer.

While the cost of VCSELs 18 is in the <$8 per 12.5-Gbps, it will drop below $2 per 20-Gbps in the next 3 to 4 years. The price is then 20¢ per 2.5 Gbps. When a device of this density sells for the $600 to $2500 price range and there are 20 such devices on a board, approximately $20,000 is saved on the board build cost. The use of VCSELs 18 for all interfaces will reduce overall system cost, improve reliability, reduce EMI and RF to near extinction, and make the design very flexible.

EXAMPLES

Both Supercomputers and new backbone communications systems need the advantage of the OpticAlley.

Supercomputers:
Supercomputers are based on the highest speed and massive parallel operations. A method of programming called vector coding makes this possible. The movement of data in parallel at the highest speed technology can supply throughput exponentially faster than using scalar operating systems. (Conventional system operation.) The need in this system is best explained by a typical data path. In vector code, a 64 bit word is processed as a unit. A minimum of 64 bits is passed in parallel. (In some systems, this path width could be a thousand times this width.) 64 bits in FDP is 128 individual copper lines imbedded through several layers of the board. This is at 2.5-Gbps to 5-Gbps. It is limited to the board and if the transfer is more than 20 inches, it must have a data recover encapsulation system. To get the data to another cabinet, it will likely be converted at the edge of the board to optical requiring SERDES and additional compilation circuitry.

Replacing these 128 individual copper lans with the OpticAlleys would mean that only two waveguides 34 would be needed, and there would be bandwidth to spare. This is assuming 12.5-Gbps to 20-Gbps. There is no need to convert the signal at the edge of the board, because the photonic signal can be piped in fiber to the next board or chassis waveguide 34. The VCSEL 18 is capable of driving meters or kilometers depending on power consumed which is still less than $1/10$ the power consumed by individual electronic FDP drivers.

Communication Backbone:

The communication industry has high speed backbone systems that must handle terabits of data in parallel. The standards for data rates are described in OC, or Optical Connection data rate. For example, OC48 is 2.5-Gbps data rate, OC 192 is 10-Gbps, OC 768 is 40-Gbps, etc. The signals come in optically, are converted to electrical energy, routed accordingly, and converted back to optical for transport to the next station. As the devices become more dense and higher data rates per device are required, the same problem that is hindering the supercomputer may also be applied here. Boards and backplanes become very expensive, noisy, and thick. The same reduction in number of links and cost can be applied to this market.

Major novelties are:
Direct modulation of the VCSEL 18
Tuned parallel optical interface
No encryption
Auto clock compensation
Auto data alignment
Dual, totally isolated thermal extractors
Electro-static isolated device
All electrical transfer of data and switching are internal to the shielded device
Dual thermal heat dissipation Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A data link with a device comprising:
an ASIC;
a heat insulation layer in contact with the ASIC;
an optical transducer layer having a plurality of transducers, with each transducer of the plurality of transducers in communication with the ASIC through the heat insulation layer, each transducer converting optical signals to electrical signals or electrical signals to optical signals, the ASIC synchronizing the electrical signals with each other and the device to be able to communicate with the device; and
an optical waveguide layer having a plurality of waveguides for carrying optical signals, each waveguide of the plurality of waveguides in optical communication with a transducer, the optical waveguide layer adjacent with the insulation layer.

2. A data link as described in claim 1 wherein the ASIC has connectors, the heat insulation layer has holes in alignment with the connectors, and each transducer in alignment with a hole in the insulation layer, each transducer in communication with a connector.

3. A data link as described in claim 2 wherein the connectors are input/output pins.

4. A data link as described in claim 3 wherein each transducer includes a VCSEL or a photonic sensor, or both.

5. A data link as described in claim 4 including a heat extraction layer disposed between the optical transducer layer and the heat insulation layer, the heat extraction layer having holes which align with the holes of the heat insulation layer.

6. A data link as described in claim 5 including a top which is pressure loaded to create proper seals in the data link.

7. A data link as described in claim 6 wherein a least one of the waveguides is used for timing synchronization.

8. A data link as described in claim 7 including a clock for timing synchronization to adjust timing before data is transmitted or received.

9. A method for transferring data to a device comprising the steps of:
producing electrical signals by an ASIC having output pins;
sending the electrical signals that have been synchronized with each other and the device from the ASIC out through the output pins to transducers of an optical transducer layer, where there is a heat insulation layer in contact with the ASIC device having holes in alignment with the input/output pins through which the electrical signals communicate from the output pins to the transducers;
converting the electrical signals to optical signals with the transducers; and
sending the optical signals in synchronization with each other and the device from the transducers to waveguides of an optical waveguide layer adjacent with the optical transducer layer.

10. A method as described in claim 9 including the steps of receiving the optical signals at a second ASIC, and converting the optical signals into electrical signals at the second ASIC.

11. A method for transferring data to a device comprising the steps of:
receiving optical signals that are synchronized with the device from an optical waveguide layer in contact with an optical transducer layer; and
receiving electronic signals from a photonic sensor device which converts the optical signals to electronic signals of the optical transducer layer through the input pins of an ASIC, where there is a heat insulation layer in contact with the ASIC having holes in alignment with the input pins through which the electrical signals communicate with the photonic sensor device to the ASIC input pins, the photonic sensor converting the photonic signals to electronic signals.

12. A method as described in claim 11 including the steps of producing electrical signals at a second ASIC, converting electrical signals to optical signals at the second ASIC and transmitting the optical signals to the optical waveguide layer so the optical signals from the second waveguide are in synchronization with the device.

* * * * *